United States Patent [19]
Aeffner

[11] Patent Number: 6,073,446
[45] Date of Patent: Jun. 13, 2000

[54] APPARATUS AND METHOD FOR REMOVING CONDENSATION FROM A TURBOCHARGING SYSTEM OF AN INTERNAL COMBUSTION ENGINE

[75] Inventor: Kurt Aeffner, Kiel, Germany

[73] Assignee: MaK Motoren GmbH & Co. KG, Kiel, Germany

[21] Appl. No.: 09/237,767

[22] Filed: Jan. 26, 1999

[30] Foreign Application Priority Data

Feb. 7, 1998 [DE] Germany ............................ 198 04 950

[51] Int. Cl.⁷ .................................................. F02B 29/04
[52] U.S. Cl. ................................................................ 60/599
[58] Field of Search ...................................... 60/598, 599

[56] References Cited

FOREIGN PATENT DOCUMENTS 24 46 490  9/1974  Germany .
8-109853  4/1996  Japan .

*Primary Examiner*—Noah P. Kamen
*Attorney, Agent, or Firm*—Alan J. Hickman

[57] ABSTRACT

In a turbocharged internal combustion engine, the condensation accumulating in a charge air cooler is directed through conduits into the exhaust duct after the exhaust turbine, in the direction of exhaust gas flow from the internal combustion engine, and is evaporated in the exhaust gas stream flowing through the exhaust duct.

13 Claims, 2 Drawing Sheets

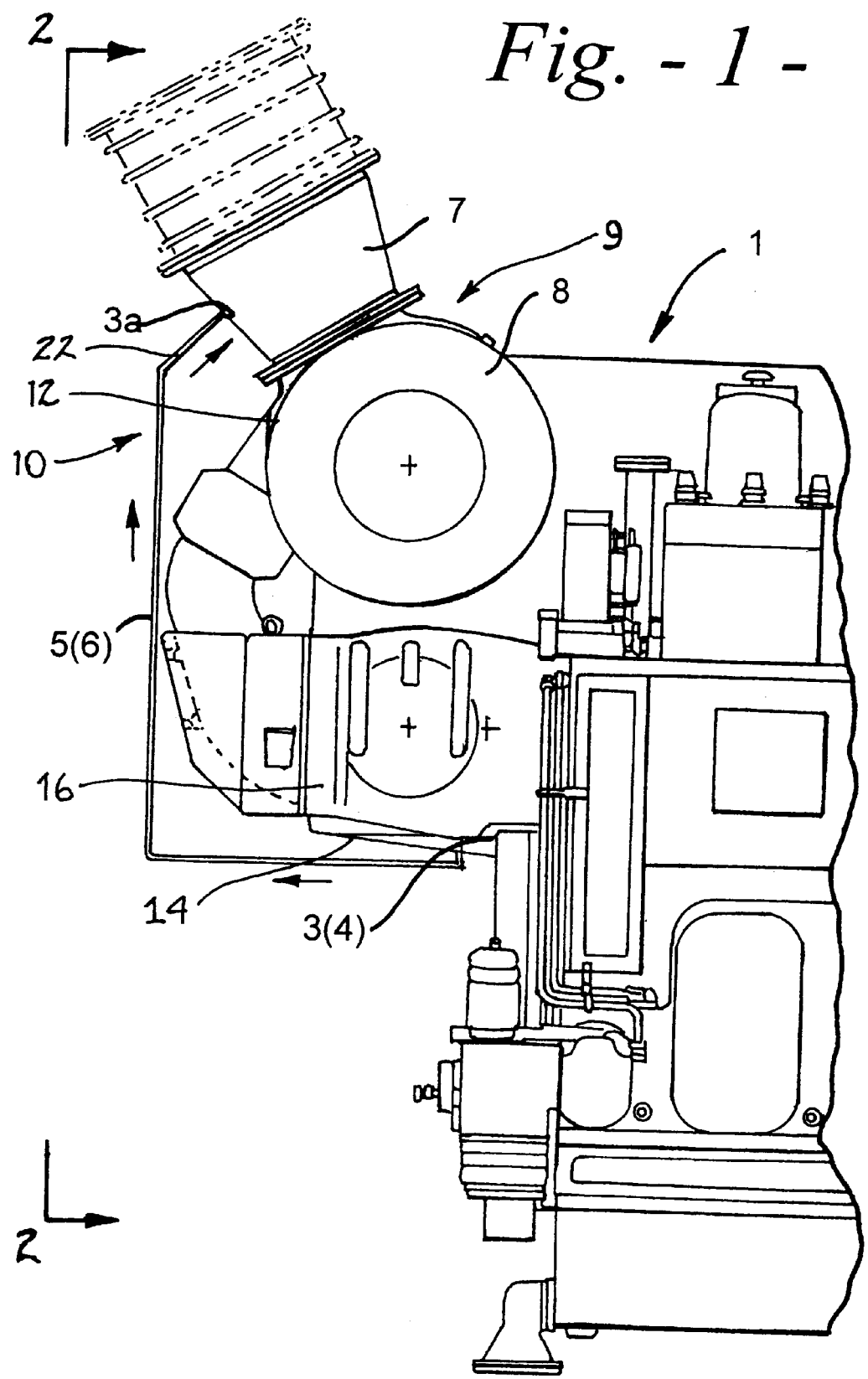
Fig. - 1 -

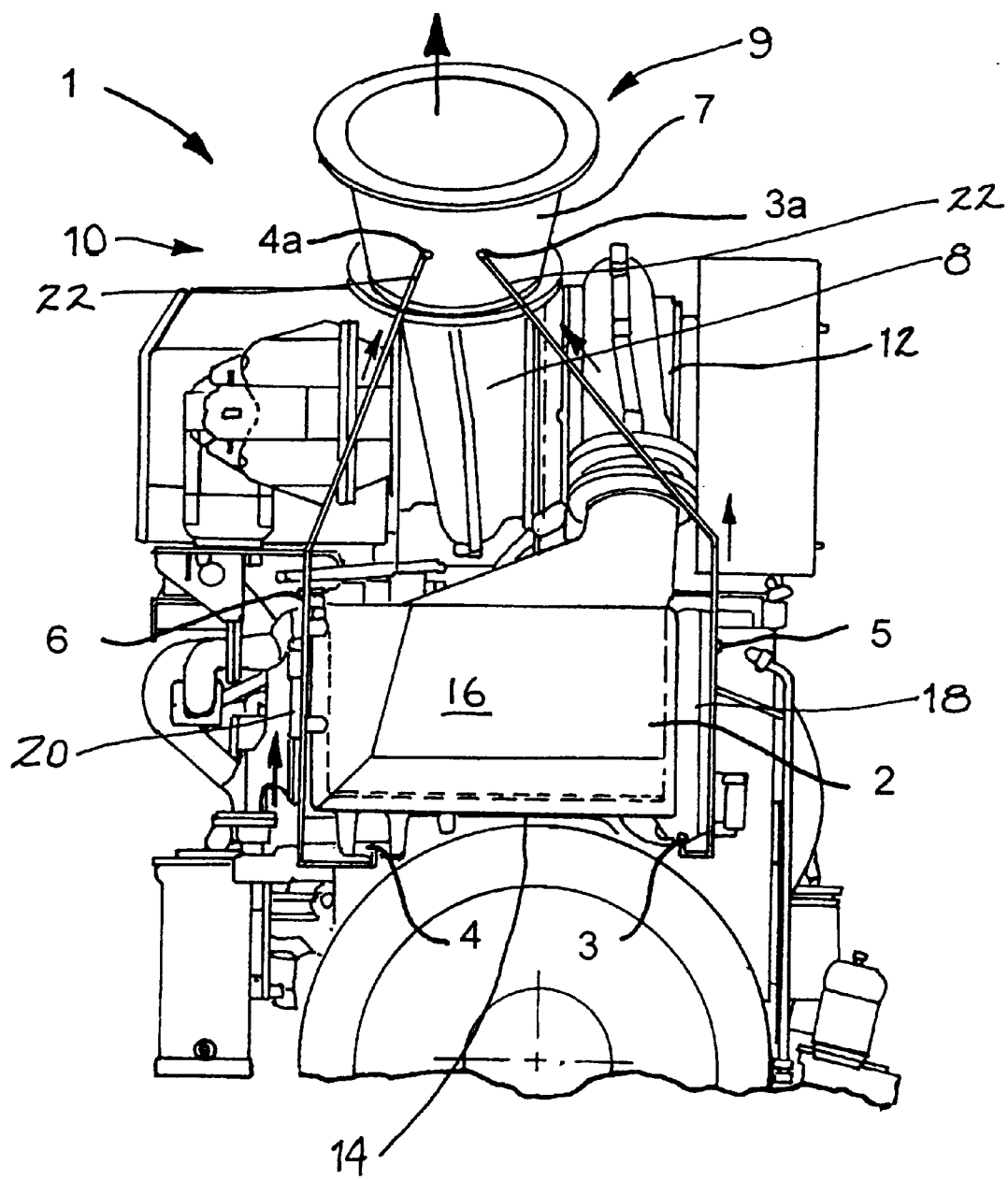
Fig. -2-

APPARATUS AND METHOD FOR REMOVING CONDENSATION FROM A TURBOCHARGING SYSTEM OF AN INTERNAL COMBUSTION ENGINE

TECHNICAL FIELD

This invention relates to a method and apparatus for removing condensation from a turbocharging system of an internal combustion engine and more to a particularly to a method and apparatus for passing condensation from a charge air cooler to an exhaust gas passing exhaust duct of the turbocharging system.

BACKGROUND ART

Internal combustion engines with higher power output, for example, diesel engines or ships, electric power generation, gas compression, fluid pumping and the like, reaching approximately 4 bar (absolute), can not always be operated at charge air temperatures above the dew point of the charge air. Under tropical conditions condensation forms in the charge air cooler, leading to corrosion in the engine. The dew point temperature at these charge pressures is significantly above 60 degrees Celsius. In order to avoid any condensation from forming, the charge air temperature must be kept between 65 and 70° C. At these charge air temperatures, the potential for thermal overheating of the internal combustion engine at full load operation under tropical conditions exists.

A known procedure to solve this problem is to drain the formed condensation from the charge air flow path by continuously blowing off the air/water mixture through orifices into the atmosphere. If only water exits, the discharge connection overflows, and a water detection sensor sounds an alarm. In order to operate without the alarm sounding, it is necessary to moderately increase the charge air temperature and/or to reduce the power.

A constant blowing-off of charge air into a machine room can also be avoided by installing a condensation collecting device. However, measurements have shown that only a small part (approx. 20%) of the formed condensation is drained through the orifices in the charge air flow path. The small droplet size of the condensation (mist formation), as well as the flow rate of the charge air, keeps large quantities of the condensation in suspension so that it enters the combustion chambers of the internal combustion engine together with the combustion air.

Placing a water separator directly at the air exit side of the charge air cooler results in the formation, collection and discharge of large quantities of condensation. The separation rate should be at least 80% by volume. The condensation quantity can be up to 50 milliliter per kilowatt hour under tropical operating conditions (intake air parameters: temperature 45° C., relative humidity 50%).

Even in ocean going ship applications, the occurring large quantities of condensation cannot be simply discharged into the bilge of the ship. The mandatory bilge water/oil separators for a bilge are designed for much smaller quantities of bilge water. The other possibility of collecting the produced condensation in a container and pumping it overboard is relatively complicated and expensive.

This invention is direction at solving one or more of the problems as set forth above.

DISCLOSURE OF THE INVENTION

In one aspect of the present invention a method for removing condensation from a turbocharging system of an internal combustion engine is provided. The turbocharging system has an exhaust gas turbine connected to an exhaust duct and a compressor connected to a charge air cooler having a housing. The method comprises the steps of: establishing a pressure difference between the housing of the charge air cooler and the exhaust duct, passing condensation automatically from the housing of the charge air cooler to the exhaust duct through a first drain conduit connected between the housing of the charge air cooler and the exhaust duct in response to the existing pressure difference, and evaporating the condensation in an exhaust gas stream flowing in the exhaust duct.

In another aspect of the present invention an apparatus for removing condensation from a turbocharging system of an internal combustion engine is provided. The turbocharging system has an exhaust gas turbine, an air compressor and a charge air cooler connected to the internal combustion engine. The charge air cooler has a housing and a first drain port. The housing is connected to the compressor and the internal combustion engine. An exhaust duct is connected to the internal combustion engine and the exhaust gas turbine. The exhaust duct has a first inlet port. A first drain conduit is connected between the first drain port and the first inlet port. The first drain conduit passes condensation. automatically from the housing to the exhaust duct in response to a pressure difference between the housing and the exhaust duct. The condensation passed by the first drain conduit is evaporated in an exhaust gas stream flowing in the exhaust duct.

Thus, a method and an apparatus is provided for removing condensation from a supercharged internal combustion engine in a simple and efficient manner and without a complicated design.

An advantage achieved by this invention is that the introduction of the occurring condensation into the exhaust duct, in the flow direction after the exhaust gas turbine, ensures evaporation cf the condensation without any residues and without any additional energy input.

The connections of the drain conduit to housing of the charge air cooler and the exhaust duct are adjacent to the engine. This minimizes the construction expense.

The introduction of the condensation in the direction of flow after the exhaust turbine is an additional advantage. Because of the pressure difference between the charge air and the exhaust gasses, the condensation can be introduced into the exhaust gas stream without any additional auxiliary devices.

In order for the charge air blow-off quantity to remain negligible, an orifice arrangement is provided in the drain lines.

When the condensation is introduced into the exhaust gas stream, an effective evaporation takes place at each load stage, as condensation only forms at higher charge pressures, precisely when the exhaust gas flow rate and exhaust temperature are high, which makes for an ideal self regulating effect. The evaporation of the exhaust is also significantly helped by the fact that a plain water stream does not enter the exhaust duct, instead an air-water-mixture spray is injected under charge air pressure into the exhaust duct.

Due to the feeding of the condensation into the exhaust duct, charge air temperature Regulation enabling the dew point to be exceeded is no longer necessary and may be eliminated in applications where the lower charge air temperature at part-load (approx. 25° to 40° C.) is not detrimental to the engine.

BRIEF DESCRIPTION OF THE DRAWINGS

FIG. 1 is a diagrammatic partial side profile of an embodiment of the present invention showing an internal combustion engine with a turbocharging system and turbocharging system condensation drain conduits, and FIG. 2 is a diagrammatic end profile of taken along lines 2—2 of FIG. 1.

BEST MODE FOR CARRYING OUT THE INVENTION

The internal combustion engine 1 having an turbocharging system 10 is generally shown in the drawings. The turbocharging system 10 includes an exhaust turbine 8, a compressor 12, and a charge air cooler 2. The turbocharging system 10 is connected to the internal combustion engine 1 in a conventional manner.

The exhaust turbine 8 is connected to an exhaust duct 9 of the internal combustion engine 1. The exhaust duct 9 passes exhaust gasses from the internal combustion engine 1. The exhaust gasses drive the exhaust turbine 8 in a conventional manner.

First and second drain ports 3 and 4 are located in the bottom 14 of a housing 16 of the charge air cooler 2. The housing 16 is connected to the compressor 12 and the inlet of the internal combustion engine 1.

The first and a second drain ports 3, 4 are spaced a predetermined distance apart and located between first and second spaced apart sides L8,20 connected to the bottom 14 of the charge air cooler 2.

One end of a first drain conduit 5 is connected to the first drain port 3 and one end of the second drain conduit 6 is connected to the second drain port 4. The other end of the first and second drain conduits 5, 6 is connected to the exhaust duct 9.

A first inlet port 3a and a second inlet port 4a is provided in the exhaust duct 9. The inlet ports 3a, 4a are connected to the exhaust duct 9 at a location after the exhaust gas turbine 8 in a direction of exhaust gas flow from the internal combustion engine 1. In particular, the first and second inlet ports 3a, 4a are disposed in a transition piece 7 of the exhaust duct 9 and the other end of the first and second drain conduits 5,6 are connected to the first and second inlet ports 3a, 4a.

The inlet ports 3a, 4a are spaced apart from each other and at preselected locations on the transition piece 7. The inlet ports 3a, 4a are separated from each other, so that the condensation enters the transition piece 7 in two different areas. In particular, the first and second inlet ports 3a, 4a are located in the transition piece 7 adjacent the exhaust turbine.

The drain conduits 5,6 are positioned around and in close proximity to the housing 16 of the charge air cooler 2. Each of the first and second drain conduits 5,6 have an angled portion 22 which positions the drain conduits 5,6 relative to the transition piece 7 for connection to the first and second inlet ports 3a, 4a of the transition piece 7. The lines 5, 6, and the first and second inlet ports 3a, 4a, preferably enter the transition piece 7 of the exhaust duct 9 near the turbine 8. This allows for an optimal evaporation of the delivered condensation.

The charge air blow-off quantity may be minimized by an orifice of conventional configuration disposed in or in association with the first and second conduits 5,6, not further illustrated. The orifices meter the rate of charge air being passed to the first and second conduits 5,6.

Industrial Applicability

With reference to the drawings, during operation of the internal combustion engine 1, condensation accumulates in the housing 16 of the charge air cooler 2. This condensation is delivered by way of the first and second drain conduits 5,6, in the direction of the arrow of FIG. 1, into the transition piece 7 of the exhaust duct 9. This occurs automatically as the result of the a pressure difference between the charge air cooler 2 and the exhaust duct 9.

The condensation delivered by the first and second drain conduits 5,6 evaporates in the exhaust gas stream, flowing and through the transition piece 7 of the exhaust duct 9.

Other aspects, objects and advantages of this invention can be obtained from a study of the drawings, the disclosure and the appended claims

What is claimed is:

1. A method for removing condensation from a turbocharging system of an internal combustion engine, said turbocharging system having an exhaust gas turbine connected to an exhaust duct and a compressor connected to a charge air cooler having a housing, said method comprising the steps of:

establishing a pressure difference between the housing of the charge air cooler and the exhaust duct;

passing condensation automatically from the housing of the charge air cooler to the exhaust duct through a first drain conduit connected between the housing of the charge air cooler and the exhaust duct in response to the existing pressure difference, and evaporating the condensation in an exhaust gas stream flowing in the exhaust duct.

2. The method, as set forth in claim 1, wherein the exhaust duct is connected to deliver exhaust from the internal combustion engine, and including the step of introducing the drained condensation into the exhaust duct after the exhaust turbine in the direction of exhaust flow from the exhaust turbine.

3. The method, as set forth in claim 2, wherein the housing of the charge air cooler has a bottom, first and second spaced apart sides connected to the bottom, and first and second drain ports connected to the bottom at spaced apart locations between the first and second sides, first and second spaced apart inlet ports connected to the exhaust duct at a transition portion of the exhaust duct, said first drain conduit being connected between the first drain port and the first inlet port, and said second drain conduit being connected between the second drain port and the and second inlet port, said method including the step of passing condensation from the first and second drain ports to the first and second inlet ports by the first and second conduits respectively.

4. A method, as set forth in claim 3, including the step of independently passing condensation by the first and second conduits, from the charge air cooler to the transition piece of the exhaust duct.

5. A method, as set forth in claim 4, including orifices disposed in the first and second conduits, and including the step of metering the rate of charge air passed to the first and second conduits.

6. A method, as set forth in claim 5, including the step of passing condensation to the transition piece of the exhaust duct at a location near the exhaust turbine.

7. An apparatus for removing condensation from a turbocharging system of an internal combustion engine, said turbocharging system having an exhaust gas turbine and a air compressor connected to the internal combustion engine, comprising:

a charge air cooler having a housing and being connected to the compressor and the internal combustion engine, said housing having a first drain port;

an exhaust duct connected to the internal combustion engine and the exhaust gas turbine;

a first inlet port connected to the exhaust duct;

a first drain conduit connected between the first drain port and the first inlet port, said first drain conduit passing condensation automatically from the housing to the exhaust duct in response to a pressure difference between the housing and the exhaust duct, said condensation passed by the first conduit being evaporated in a hot exhaust gas stream flowing in the exhaust duct.

8. The apparatus, as set forth in claim 7, wherein the exhaust duct is connected to deliver exhaust from the internal combustion engine, said first inlet port being connected to the exhaust duct at a location after the exhaust gas turbine in a direction of exhaust flow from the internal combustion engine.

9. The apparatus, as set forth in claim 8, including:

a second drain port connected to the charge air cooler at a location on the housing spaced from the first drain port;

a second inlet port connected to the exhaust duct at a location on the exhaust duct spaced from the first inlet port;

a second drain conduit connected between the second drain and inlet ports, said second drain conduit passing condensation automatically from the housing to the exhaust duct in response to a pressure difference between the housing and the exhaust duct, said condensation passed by the second drain conduit being evaporated in a hot exhaust gas stream flowing in the exhaust duct.

10. The apparatus, as set forth in claim 9, wherein said second inlet port being connected to the exhaust duct at a location after the exhaust gas turbine in a direction of exhaust flow from the internal combustion engine.

11. The apparatus, as set forth in claim 10, wherein said housing of the charge air cooler has a bottom, first and second spaced apart sides connected to the bottom, said first and second drain ports being connected to the bottom at spaced apart locations between the first and second sides, said first and second spaced apart inlet ports being connected to the exhaust duct at a transition portion of the exhaust duct.

12. The apparatus, as set forth in claim 11, including orifices disposed in the first and second conduits, said orifices metering a rate of charge air being passed to the first and second conduits.

13. The apparatus, as set forth in claim 12, wherein the first and second inlet ports are located in the transition piece adjacent the exhaust turbine.

* * * * *